Figure 1:
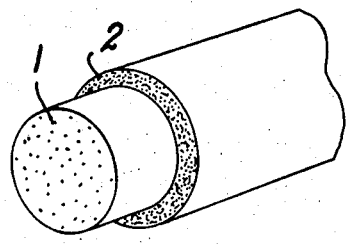

United States Patent
Clement et al.

[15] 3,701,444
[45] Oct. 31, 1972

[54] FLEXIBLE WELDING ROD HAVING ORGANICALLY BOUND CORE AND PROTECTIVE SHEATH

[72] Inventors: Rene Clement, Route de Bigary, 26 Suze-la-Rousse; Pierre Manfredi, Chemis de Caffin, 84 Ste-Cecile-les-Vignes; Roger Roulliay, 15 rue de Cygne, 91 Vauhallan, all of France

[22] Filed: Aug. 24, 1970

[21] Appl. No.: 66,305

[30] Foreign Application Priority Data
Aug. 28, 1969 France..................6929483

[52] U.S. Cl..................................219/146, 219/137
[51] Int. Cl............................................B23k 35/22
[58] Field of Search......219/146; 117/202, 203, 204, 117/205, 206, 207; 148/24, 26; 219/73, 74, 76, 137

[56] References Cited

UNITED STATES PATENTS

| | | |
|---|---|---|
| 2,468,372 | 4/1949 | Landis......................219/137 |
| 3,345,495 | 10/1967 | Quaas et al................219/146 |
| 2,468,371 | 4/1949 | Ladis et al.................219/137 |
| 3,493,713 | 2/1970 | Johnson......................219/73 |
| 3,102,827 | 9/1963 | Kriewall et al............117/207 |
| 2,700,091 | 1/1955 | Culbertson et al........219/146 |
| 1,944,753 | 1/1934 | Mathias.....................219/146 |
| 3,084,074 | 4/1963 | Wasserman et al........117/207 |
| 2,552,176 | 5/1951 | Hummitzsch..............117/204 |
| 1,871,257 | 8/1932 | Cadwell.....................117/202 |
| 3,108,020 | 10/1963 | Var Der Willigen et al..........................117/207 |
| 3,004,872 | 10/1961 | Stark.........................117/202 |
| 2,870,047 | 1/1959 | Kee............................117/202 |
| 1,972,063 | 8/1934 | Judy..........................117/202 |

*Primary Examiner*—J. V. Truhe
*Assistant Examiner*—George A. Montanye
*Attorney*—Cameron, Kerkam & Sutton

[57] ABSTRACT

Primarily intended for arc welding, the cord consists of a core formed of a mineral powder which is mixed with an organic binder and contains at least the constituents of a welding flux, the core being encased in a flexible protective sheath of organic material.

7 Claims, 3 Drawing Figures

FLEXIBLE WELDING ROD HAVING ORGANICALLY BOUND CORE AND PROTECTIVE SHEATH

This invention relates to a cord which is primarily intended for use in arc welding techniques and is also concerned with a method of arc welding for the practical application of a cord of this type.

One method of arc welding consists in producing an arc between the part to be welded and a fusible electrode formed of metal or metal alloy which is intended to form the welded joint. If a metal wire having sufficient flexibility to be wound on a spool is employed as electrode, it is then possible to feed the welding torch continuously and to render the process automatic. However, a solution of this kind cannot always be carried into practice in a conventional welding process by reason of the difficulties encountered in obtaining fusible wire of a grade which is suited on the one hand to the metal to be welded and on the other hand to the quality of the joints to be formed.

In order to obtain a weld of good quality, it is necessary in the majority of cases to bring a flux of suitable composition into the arc zone at the same time as the metal wire, the intended function of said flux being either to clean and deoxidize the part prior to welding or to form a slag which serves first to protect the pool of molten weld metal and then to protect the weld during solidification. In some cases it is also necessary to add an alloying element which is intended to combine with the alloy of the metal wire in order to adjust the composition of the weld. A first solution consists in supplying the flux in the form of a simple powder independently of the electrode but this gives rise to the disadvantages which are inherent in the use of powders, especially in regard to the irregular distribution of constituents and the difficulty involved in ensuring constant delivery.

Another solution which already constitutes an improvement consists in incorporating the flux within the electrode either by placing the flux inside a metal tube or on the contrary by providing a coating of flux around a metal wire. Other drawbacks are met with in this instance, the chief difficulty being the fact that the rigidity of electrodes which are constructed in this manner hinders the formation of welds. Moreover, in the first of the two alternatives just mentioned, it is difficult to ensure a constant proportion between the weight of the flux and the weight of the metal tube at the time of manufacture; in the second alternative, the presence of the coating makes the electrode very delicate both during storage and use and hinders the supply of electric current. Furthermore, in the case of all the solutions mentioned, it is clearly presupposed that the essential constituent of the weld metal is a drawable alloy.

Finally, although consideration has already been given to the possibility of protecting the welding flux by means of a sheath in order to permit underwater welding, the designs proposed up to the present time always consisted of electrodes in the form of rigid rods made up of a central metal wire or an outer metal tube.

The main object of the invention is to overcome the different disadvantages of conventional arc welding techniques as recalled in the foregoing, especially by making it possible to ensure that welding torches are supplied continuously with a product which has a uniform composition, which is easy to manufacture and to use, which is not delicate and has storage stability.

To this end, the invention proposes a cord for use especially in arc welding and characterized in that it comprises a core which is formed of a mineral powder together with an organic binder and in which said powder contains at least the constituents of a welding flux, a flexible protective sheath of organic material being placed around said core. Said binder and said sheath are usually chosen so as to be totally combustible at the temperature of utilization of the flux.

In accordance with a secondary feature, at least one alloying element of a weld metal can be incorporated in powdered form in said core.

In a preferred embodiment of the invention, said mineral powder also contains the constituents of a weld metal, the binder and the sheath being preferably combustible at the melting temperature of the weld metal. It is often useful in this case to form the core of the welding cord in two coaxial zones containing a powder which is bound by the organic binder and formed respectively by the constituents of the weld metal in one zone and by the constituents of the welding flux in the other zone.

In the cord according to the invention, the proportion of organic binder in the core can be reduced to a relatively small proportion. Cohesion, mechanical strength and storage stability as well as flexibility are ensured by the protective sheath.

The welding cord under consideration is easy to manufacture and is preferably formed by coextrusion.

In the application of the cord in accordance with the invention to arc welding techniques, a fusible electrode which is separate from the welding flux may be employed if necessary while the flux is provided in the form of a cord as hereinabove defined. Accordingly, it is an advantage to spray the flux in the hot state onto the weld zone by means of a spray torch which ensures combustion of the organic products, melting of the flux constituents and preheating of the parts to be welded while projecting the molten flux particles onto said parts.

Further properties of the invention will become apparent from the following description in connection with particular modes of application which have been chosen by way of example. It will naturally be understood that this description is not to be interpreted in any limiting sense so far as the scope of the invention is concerned.

Figure 2:
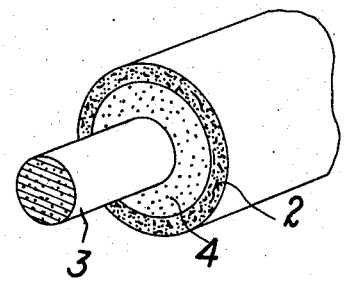
Figure 3:
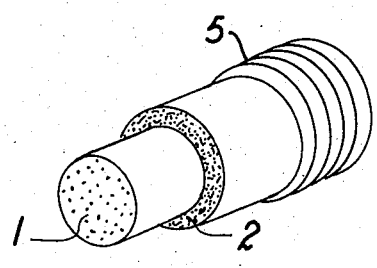

Reference is made to the accompanying FIGS. 1 to 3 which represent three different embodiments of the welding cord in accordance with the invention.

A few embodiments of the cord which is intended to be utilized in the arc welding process will first be described but without reference to the method of manufacture and the exact nature of the constituents.

In the embodiment of FIG. 1, the cord contains only the flux constituents, which, at the time of welding, serve to form the slag for protecting the pool of molten weld metal and then the weld during solidification. The flux is composed of a number of mineral elements or compounds. These mineral constituents which are partially agglomerated by a small proportion of organic binder which is within the range of 0.5 to 8 percent by weight, for example, form the core 1 of the welding cord. Said cord is covered with an outer sheath 2 formed of a flexible film of organic material having a thickness between 0.1 and 0.5 mm.

At the time of a welding operation, the extremity of the cord is moved from point to point within the zone of an electric arc which is formed between the parts to be welded and a fusible electrode constituted by the metal or the alloy which is intended to form the weld.

In an alternative mode of utilization which is particularly advantageous, the combustion of organic substances and melting of the flux are no longer produced by the arc itself, but by a spray torch which is placed next to the welding torch. The spray torch accordingly projects the molten particles of flux onto the surface of the parts to be welded and thus has a contributory function in heating the parts at the level of the weld to be formed.

In a different mode of procedure, a powdered filler metal or even a powder containing all the constituents of the weld metal is admixed with the constituents of the welding flux. This powder can be made up either of the actual alloy which is employed for the weld or of a metal or more simple alloy and of other separate constituents which will combine with each other during the welding operation.

By way of alternative and as is illustrated in FIG. 2, coextrusion can be carried out by forming the core of the welding cord in two coaxial zones; the metal powder which is agglomerated by an organic binder forms the central cylindrical portion 3 and is surrounded coaxially by the flux 4 which is agglomerated in the same manner. The sheath 2 of organic material surrounds the complete assembly.

In some applications the welding cord can be melted in the weld zone either with a refractory (non-consumable) electrode or with a fusible (consumable) electrode. In the first case, the cord contains together with the flux all the constituents of the weld metal. In the second case, the cord also serves to bring into the weld zone and at the same time as the flux either one or a number of alloying elements which combine with the metal or alloy of the fusible electrode at the time of welding and thus makes it possible to adjust the composition of the weld as a function of the nature of the material to be welded and of the properties which are sought.

In another embodiment which is illustrated in FIG. 3, the welding cord in accordance with the invention additionally comprises a metal wire 5 which is wound around the cord outside the sheath of organic material. This arrangement makes it possible to endow the cord with surface conductivity and consequently to facilitate its use as an electrode, the properties of flexibility of said cord being nevertheless retained whilst cohesion and protection of the powder are ensured by the binder and the sheath of organic material.

Whatever form of construction may be adopted among the different alternatives described in the foregoing, the cord can be fabricated in particular so as to form by coextrusion both the internal core of binder and of mineral powder (which may be coextruded in two parts if necessary) and the sheath of organic material. In the particular case in which a thermoplastic product is employed both for the binder of the core and for the sheath, the hot extrusion process is preferably adopted. Otherwise, the operation is preferably carried out in the cold state, in which case the products are placed either in emulsion or in solution in a suitable diluent which is then eliminated by drying. The use of a non-aqueous organic diluent makes it possible to prevent embrittlement of the weld which could otherwise be caused by the hydrogen which is evolved at the time of dissociation of the water in an electric arc. The addition of a plasticizer serves to improve the flexibility of the product which is finally obtained.

The same organic binder is advantageously employed on the one hand for the core which contains the mineral powder and on the other hand for the outer sheath of organic material but organic binders of different types can also be employed. In general, the sheath or organic material represents a proportion of approximately 10 percent by weight of all the constituents of the core and of the sheath; in the end product, this results in a sheath thickness of the order of 0.10 to 0.15 mm which is sufficient to ensure both protection and flexibility. The mineral constituents of the core are incorporated with the organic binder in the form of a powder which preferably has a particle diameter of less than 0.5 mm. The proportion of organic binder in the core is usually within the range of 0.5 to 8 percent by weight but a higher proportion of up to 30 percent by weight in particular is advantageously employed in the case of a cellulose flux in order to derive advantage from the evolution of $CO_2$ at the time of welding. The same effect can in any case be obtained by increasing the thickness of the sheath.

The composition of the welding cord in accordance with the invention is specified hereinafter in a few particular examples of application.

EXAMPLE 1

For the purpose of welding ordinary structural steel having a low carbon content, a flexible cord is prepared in accordance with the embodiment of FIG. 1.

A flux is employed in powdered form and has the following composition:

| | parts by weight |
|---|---|
| Calcium carbonate | 40 |
| Fluorspar | 25 |
| Cryolite | 4 |
| Titanium dioxide | 10 |
| Ferromanganese | 5 |
| Ferrosilicon | 10 |

This powder is screened to a particle size of less than 150 microns and there are then mixed therewith 200 parts by weight of steel powder which is low in carbon and has a mean particle size of 100 microns.

In respect of 100 parts of the mixture, there are then added 5 parts of polyvinyl acetate in solution in 20 parts of ethyl acetate. After addition of 0.5 part of plasticizer (dibutyl phthalate), the aggregate is mixed for a period of one hour in order to ensure homogenization.

The paste obtained is shaped by extrusion at the same time as another paste which is prepared in the same manner but without mineral powder and which is intended to form the sheath.

At the discharge end of the extrusion press, the product obtained is subjected to drying at room temperature for period of 24 hours in order to remove the solvent.

EXAMPLE 2

In order to weld molybdenum stainless steel having the following composition:

|  | weight % |
|---|---|
| carbon | 0.03 |
| chromium | 18 |
| nickel | 12 |
| molybdenum | 2.8 |
| iron | the remainder | there was prepared a welding cord in accordance with FIG. 2 containing on the one hand the weld alloy which is identical with the stainless steel alloy to be welded and on the other hand a flux having the following composition:

|  | weight % |
|---|---|
| calcium carbonate | 35 |
| fluorspar | 30 |
| silicoaluminate | 10 |
| titanium oxide | 3 |
| ferromanganese | 2 |
| ferrosilicon | 4 |
| ferronickel | 10 |
| ferrochromium | 6 |

After mixing with the binder in two different pastes, namely on the one hand the alloy powder and on the other hand the flux powder, the cord is shaped by coextrusion; the weld alloy constitutes the central zone having a diameter of approximately 4 mm and the flux forms a surrounding ring having an external diameter of 6.7 mm. The proportion of binder is of the order of 5 percent by weight of ethylcellulose after evaporation of the ethanol which is employed as diluent.

The sheath of organic material is formed from a paste of ethylcellulose in ethanol, there being added to the mixture 5 percent by weight of dibutyl phthalate. The proportion of said paste with respect to that which forms the core is of the order of 10 percent by weight in order to produce a sheath having a thickness of 0.15 mm, for example, in respect of a diameter of 7 mm.

EXAMPLE 3

By way of example in order to illustrate the alternative embodiment of FIG. 3, the foregoing welding cords as obtained in Examples 1 and 2 are made conductive by winding a metal wire on the sheath with contiguous turns, said wire having a small diameter (1 mm).

EXAMPLE 4

In order to weld ordinary low-carbon structural steel, the core of the welding cord is formed from the following constituents:

|  | parts by weight |
|---|---|
| Thermoplastic binder (ethylcellulose) | 25 |
| Rutile | 16.7 |
| Silicoaluminate | 5 |
| Calcium carbonate | 2.7 |
| Ferroalloy | 0.6 |
| Steel powder | 50 |

The mineral constituents in the form of a powder having a particle size which is less than 125 microns are mixed with the powdered thermoplastic binder. The aggregate is shaped by hot extrusion. The sheath is formed by coextrusion from the same binder.

In all the examples hereinabove described, the method according to the invention makes it possible to obtain a cord having a sufficient degree of flexibility to permit of its being wound on a spool and consequently to permit of continuous feed to a welding unit. Said cord has the same advantages as metal wires from the point of view of insensitivity to mechanical impacts and thermal shocks. In addition, said cord is perfectly calibrated. But on the other hand, compositions which would not be possible with wires can be obtained by means of said cord by incorporating, for example, constituents of the flux or of the alloying elements which are not readily drawable. The sheath of organic material serves to protect the cord against external contamination and makes it insensitive to variations in relative humidity of the surrounding atmosphere. Furthermore, the cord is not subject to variations in moisture and in delivery as is the case with free powders since it is displaced mechanically. Since it is neither delicate nor fragile, the cord can therefore be easily stored and handled.

Compared with conventional coated electrodes, the welding cord makes it possible to reduce the hazards of formation of blow-holes at the time of welding by virtue of its insensitivity to moisture. The weld metal deposited is low in hydrogen and is therefore free from the embrittling action which would be due to hydrogen. Melting of the electrode is a smoother process; projections are reduced both in number and in volume. Finally, the mechanical properties of the welded joints are improved.

What is claimed is:

1. In an arc welding cord the combination of a core consisting of a homogeneous agglomerated mixture of a mineral powder containing the constituents of a welding flux and an organic binder and a flexible sheath of organic material around said core.

2. A cord according to claim 1, wherein the welding flux contains alloying elements.

3. In an arc welding cord the combination of a core consisting of a homogeneous agglomerated mixture of a mineral powder of a welding alloy and an organic binder and a flexible protective sheath of organic material around said core.

4. A cord according to claim 3, wherein said powder contains a number of separate constituents forming an alloy melting bath.

5. In an arc welding cord the combination of a core of a homogeneous mixture of a mineral powder and organic binder in each of two coaxial zones, the mineral powder being the constituents of a welding flux for one of the zones and being a welding alloy for the other zone and a flexible protective sheath of organic material around said core.

6. In an arc welding cord the combination of a core of a homogeneous agglomerated mixture of a mineral powder and organic binder in each of two coaxial zones the mineral powder being the constituents of a welding flux for one zone and having separate constituents forming an alloy during the welding process for the other zone and a flexible protective sheath of organic material around said core.

7. A method of arc welding including the step of melting a cord consisting of a mineral powder containing in a homogeneous agglomerated mixture the constituents of a welding flux and an organic binder and a flexible sheath of an organic material around said core in the arc zone by a spray torch.

* * * * *

PO-1050
(5/69)

UNITED STATES PATENT OFFICE
CERTIFICATE OF CORRECTION

Patent No. 3,701,444           Dated October 31, 1972

Inventor(s) Rene Clement; Pierre Manfredi and Roger Roulliay

It is certified that error appears in the above-identified patent and that said Letters Patent are hereby corrected as shown below:

[73]  Assignee: Commissariat A L'Energie Atomique and Societe De Fabrication D'Elements Catalytiques (SFEC), Paris, France and Bollene, France.

Signed and sealed this 17th day of April 1973.

(SEAL)
Attest:

EDWARD M. FLETCHER, JR.                ROBERT GOTTSCHALK
Attesting Officer                      Commissioner of Patents